W. MOORE.
SELF MEASURING DISPENSING VESSEL.
APPLICATION FILED FEB. 24, 1917. RENEWED SEPT. 29, 1919.
1,328,184.                           Patented Jan. 13, 1920.
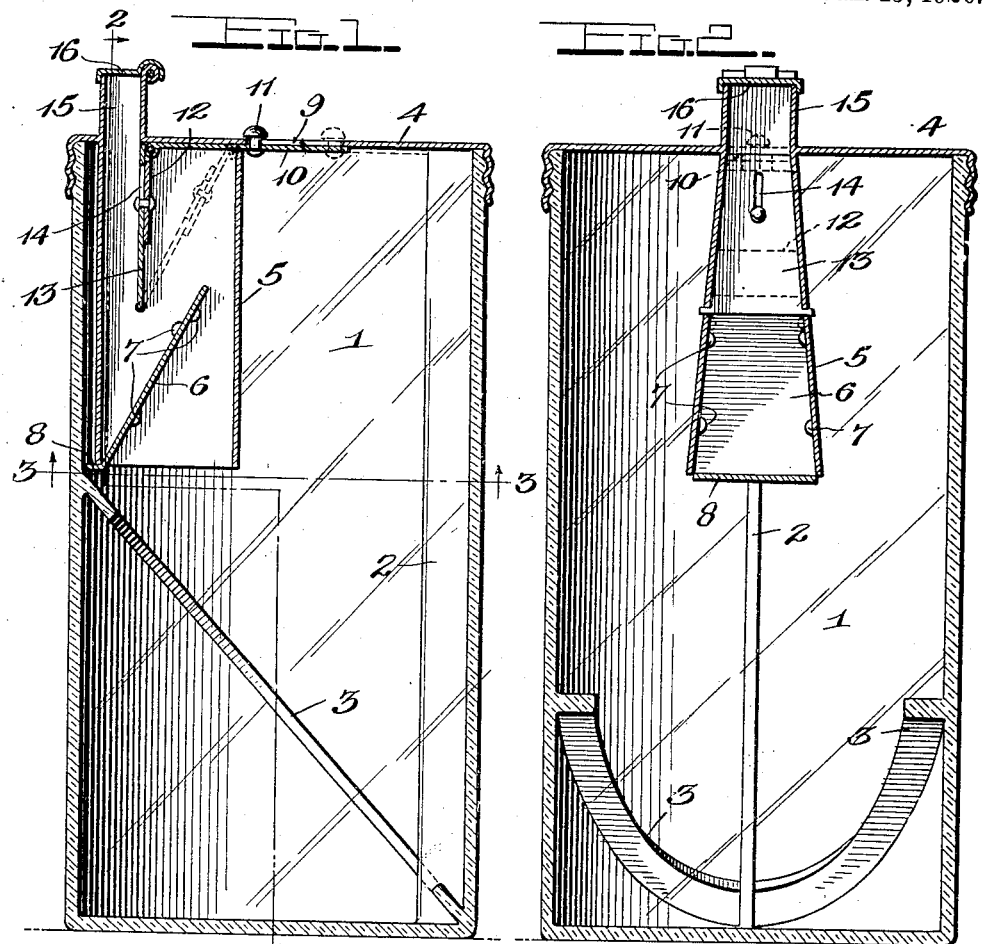
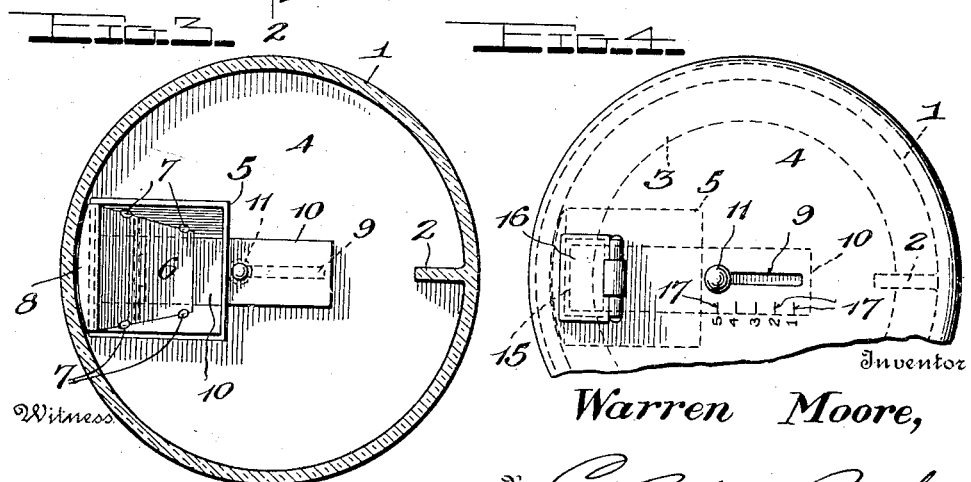
Warren Moore,
Inventor

UNITED STATES PATENT OFFICE.

WARREN MOORE, OF LADYSMITH, WISCONSIN.

SELF-MEASURING DISPENSING VESSEL.

1,328,184.      Specification of Letters Patent.      Patented Jan. 13, 1920.

Application filed February 24, 1917, Serial No. 150,346. Renewed September 29, 1919. Serial No. 327,194.

*To all whom it may concern:*

Be it known that I, WARREN MOORE, a citizen of the United States, residing at Ladysmith, in the county of Rusk and State of Wisconsin, have invented certain new and useful Improvements in Self-Measuring Dispensing Vessels, of which the following is a specification.

This invention relates to a self measuring bowl especially adapted for use as a sugar bowl in hotels, cafés, boarding houses and the like places, though adapted for use with any dry, powdered or granulated material such as salt, pepper, etc. and the size of the container may be varied according to the material to be dispensed. But as it is especially designed for the delivery of measured quantities of sugar it will be referred to hereafter, for illustration purposes, as a sugar bowl.

The invention consists in the novel features of construction hereinafter described, pointed out in the claims and shown in the accompanying drawings, in which:—

Figure 1 is a vertical longitudinal section.

Fig. 2 is an irregular section, on the line 2—2 of Fig. 1.

Fig. 3 is a section on the line 3—3 of Fig. 1.

Fig. 4 is a plan view, partly broken away.

In the drawings 1 designates the container or bowl, preferably cylindrical in form, and along one vertical side it is provided with rib 2 to prevent rolling, when laid on the side.

A circumferential, obliquely disposed rib 3 is formed on the interior of the bowl extending from the bottom of the bowl on one side to a point about half way up the bowl on the opposite side. This rib serves as a guide for guiding the contents of the bowl to a measuring device hereafter described in detail.

Secured in any way on the top of the bowl, as by threading, is a cap 4. This cap carries a depending casing 5, adjacent one side of the bowl and which opens at its inner end adjacent the uppermost portion of the guide rib 3. As shown in Fig. 2 this casing tapers upwardly.

Arranged in the lower portion of the casing is an inclined partition 6, held in place by lugs 7. The lower end of the partition is bent as at 8 and engages and projects beyond the lower edge of the casing and by catching this projection with the thumb the partition can be slid out of place for cleaning.

This partition does not extend entirely across the casing but leaves a passage for the contents of the bowl.

The cap 4 is slotted as at 9 and on the under side of the cap works a slide 10 having a pin 11 that travels in the slot and by means of which the slide may be moved. A sectional partition depends from this slide, the upper section 12 being hinged to the slide and the lower end of the lower section 13 being pivoted in the casing. To permit extension of the partition as the slide is moved from the position shown in full lines in Fig. 1 to that shown in dotted lines, a slot 14 is formed in the section 13 and the two sections loosely pinned together, the pin working in the slot 14.

A suitable spout 15 alines with the passageway formed by said sectional partition, and a hinged lid 16 normally closes the spout.

A suitable scale 17 is placed on the cap 4 adjacent the slot 9 and may designate amounts, such as one, two or more teaspoonfuls. The shifting of the slide 10 and consequent moving of the partition 12—13 determines the amount delivered at one time.

The operation of the device is as follows:—

After the desired amount of sugar has first been placed in the bowl it is inverted and sugar directed by the guide 3 will run into the casing, pass the inner end of the partition 7, which prevents it reaching the spout, and will be termed a spout-guard, and fills a portion of the casing adjacent the cap.

The bowl is then returned to normal position and a portion of the sugar will return to the body of the bowl, and the remainder will flow into the pocket formed by the casing and the spout-guard. Then when the bowl is again inverted the sugar from this pocket will flow out through the spout, the lid opening automatically when the bowl is inverted. At the same time a new supply will collect in the casing next the cap ready to flow into the pocket on return of bowl to normal position, and as long as the supply of sugar lasts a predetermined amount will be fed out each time the bowl is inverted.

The device is sanitary, avoids waste of the contents and protects them from flies, dirt, and the inserting of spoons that may have been already in use for other purposes.

What I claim is:—

1. In a device of the kind described, a bowl, a cap therefor, a depending measuring casing carried by the cap, and an oblique interior rib carried by the bowl and adapted to direct the contents of the bowl to said casing.

2. In a device of the kind described, a bowl, a cap therefor, a depending, downwardly open casing carried by the cap, a spout carried by the cap and communicating with the casing, a spout guard carried by the lower portion of the casing, a slide carried by the cap, and a sectional partition, pivoted in the casing and hinged to the slide, as and for the purpose set forth.

3. In a device of the kind described, a bowl, a cap, a slide movable on the inner face of the cap and operable from the exterior of the cap, a depending casing carried by the cap, a spout, a hinged lid carried by the spout, a removable, obliquely arranged partition in the lower portion of the casing, and an extensible partition in the upper portion, said last mentioned partition having one end pivotally connected to the casing and the other to the slide.

In testimony whereof I affix my signature.

WARREN MOORE.